(12) United States Patent
Truu et al.

(10) Patent No.: US 11,018,856 B2
(45) Date of Patent: May 25, 2021

(54) AUDITABLE SYSTEM AND METHODS FOR SECRET SHARING

(71) Applicant: Guardtime SA, Lausanne (CH)

(72) Inventors: Ahto Truu, Tartu (EE); Rando Mihkelsaar, Tallinn (EE); Hema Krishnamurthy, Phoenix, AZ (US); Jeffrey Pearce, Amstelveen (NL)

(73) Assignee: Guardtime SA, Lausanne (CH)

( * ) Notice: Subject to any disclaimer, the term of this patent is extended or adjusted under 35 U.S.C. 154(b) by 0 days.

(21) Appl. No.: 16/567,060

(22) Filed: Sep. 11, 2019

(65) Prior Publication Data

US 2021/0075595 A1     Mar. 11, 2021

(51) Int. Cl.
*H04L 29/06*     (2006.01)
*H04L 9/08*      (2006.01)
*H04L 9/32*      (2006.01)

(52) U.S. Cl.
CPC .............. *H04L 9/083* (2013.01); *H04L 9/085* (2013.01); *H04L 9/3247* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 7,260,716 B1* | 8/2007 | Srivastava | H04L 9/0825 380/264 |
| 9,565,020 B1* | 2/2017 | Camenisch | H04L 63/0815 |
| 10,805,072 B2* | 10/2020 | Corduan | H04L 63/102 |
| 2008/0082817 A1* | 4/2008 | Takahashi | G06F 21/31 713/155 |
| 2011/0208964 A1* | 8/2011 | Sama | H04L 9/3271 713/168 |
| 2014/0173270 A1* | 6/2014 | Matsuo | H04L 9/0869 713/150 |
| 2019/0251558 A1* | 8/2019 | Liu | G06Q 20/389 |
| 2020/0084049 A1* | 3/2020 | Lindell | H04L 9/085 |

FOREIGN PATENT DOCUMENTS

WO    WO-2019046651 A2 *  3/2019  ........... H04L 9/00

* cited by examiner

*Primary Examiner* — Maung T Lwin
(74) *Attorney, Agent, or Firm* — Jeffrey Pearce

(57) ABSTRACT

Parties communicate input values to a central entity by first decomposing them according to a chosen operation into share values, which are sent either directly or, in a transformed form such as being hashed and/or encrypted, via a bulletin board data structure, to respective nodes, such that no node receives the input value itself. The nodes then combine the share values using the operation and pass these respective node values to the central entity for computation of a global value. The operation of the parties and of the nodes may be made verifiable by aggregating the share values within a party or the received share values within a node using a data and computational structure such as a hash tree or skip list. Digital signing and timestamping may also be applied.

14 Claims, 9 Drawing Sheets

AUDITABLE SYSTEM AND METHODS FOR SECRET SHARING

FIELD OF THE INVENTION

This invention relates to the subfield of data security known as secret sharing.

BACKGROUND

In various situations, contributors to some global result do not wish or should not share their individual contributions to the total with other contributors. This may be because the contributors may be required to keep their respective data secret from others, but may also simply be because they do not want to. For example, participants in a survey of total income levels in an area may not want to reveal their incomes to their neighbors. Similarly, assume that a central authority wants to compile information about the total available stockpile of some item (such as some drug or vaccine) among many competitors, but the individual competitors do not wish to reveal their amounts to the others.

Even purely computational situations may arise in which parties contribute input values to some function, but need to keep their contributed input values secret from other parties. Some distributed decryption or data signature routines face this problem, for example.

Modern solutions in the area of secret sharing were proposed independently by Adi Shamir and George Blakley in 1979, and research in the area has been active ever since. As just one example, since about 1982, many researchers have additionally proposed schemes for ensuring the secrecy of individual contributions in one area of secret-sharing known as "multi-party computation".

Although existing secret-sharing schemes may give individual contributing parties varying levels of assurance that their inputs to the system are secret from other parties, what is also needed is a way to increase the integrity of the entire process, for example, upon an audit.

BRIEF DESCRIPTION OF THE DRAWINGS

FIGS. 6A-6C illustrate different roster configurations.

DETAILED DESCRIPTION

Different embodiments described below provide different solutions to different variations of the general problem of how to determine an aggregate result from contributions from a plurality of parties, without the parties having to reveal their individual contributions and, preferably, in a way that allows the result and even individual contributions to be reliably audited. In what is assumed to be the most common uses for embodiments, the aggregate result is the sum, or some function of the sum, of the contributions of the parties. Consequently, this form of aggregation (summation) is used below to describe different embodiments. A modification of this assumption to include other operations is also described below.

Basic Embodiment

Figure 1:
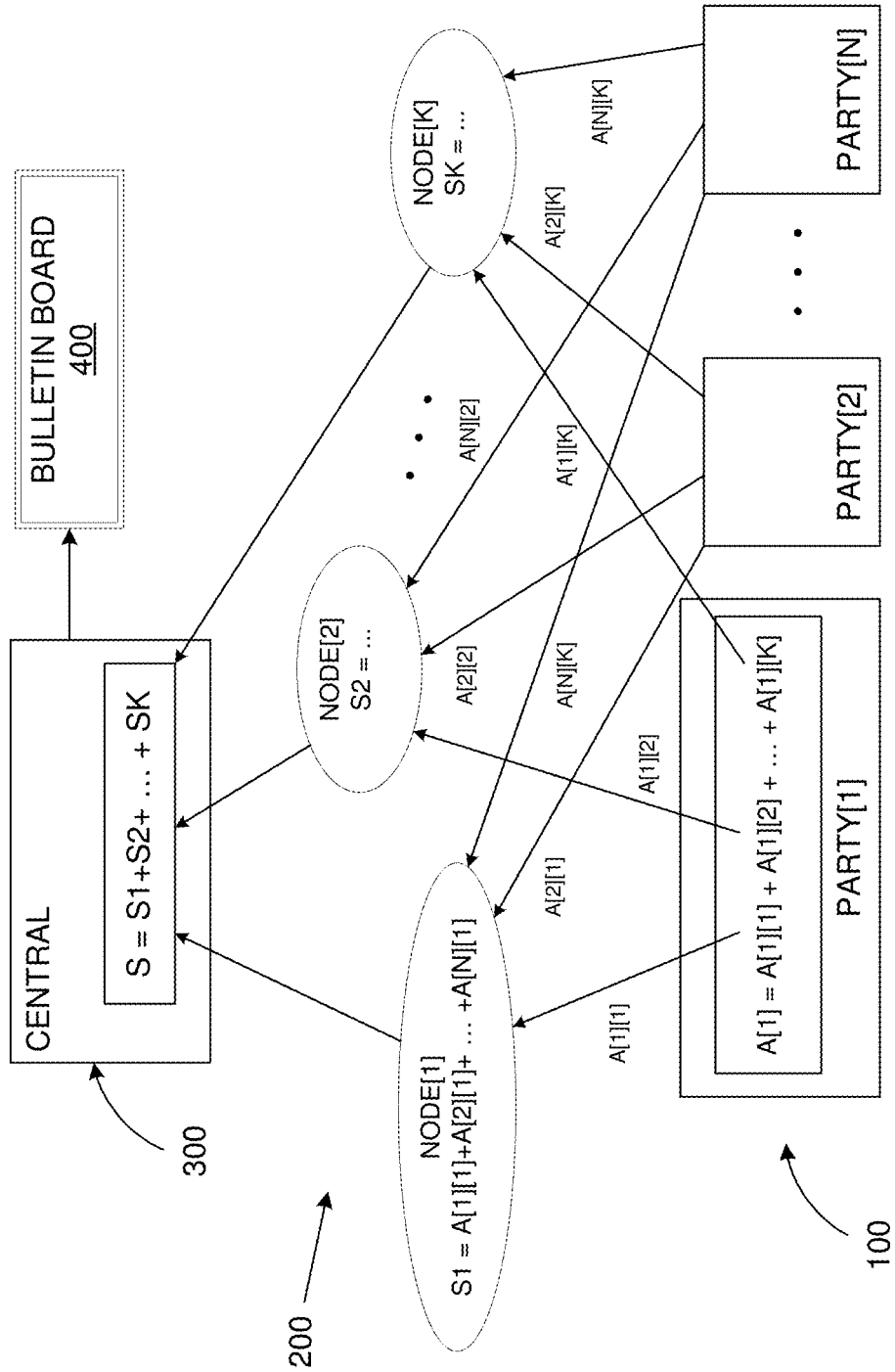
FIG. 1 illustrates the relationship between multiple parties and nodes to which the parties submit values.

See FIG. 1, which illustrates different systems (entities) and their relationships in different embodiments. By way of illustration, for this embodiment, assume that there are N parties PARTY[1], PARTY[2], ..., PARTY[N] (labeled collectively as 100), each of which can communicate using any known method, such as over a network, with K nodes NODE[1], NODE[2], ..., NODE[K] (collectively numbered 200), each of which can communicate with a central entity 300, which is the entity that is to aggregate the values associated with each party. The parties, nodes, and the central entity may be implemented by and in any known computing system. The parties' systems may, but need not be, smaller systems such as laptop computers, fixed-terminal systems such as desktop computers, or tablets or even smart phones, whereas the nodes and central entity may be implemented using servers. For example, in a scenario in which a governmental authority wants to know about the total stock of some vaccine or drug, the parties might be individual pharmacies, which submit information from small computers or smart phones via a corresponding installed application; the nodes might be regional authorities or distributors, and the central entity might be a sever run by the governmental authority. This is not a requirement, however: Any computing system with sufficient computing power and connectivity with the other systems may be used.

Now assume that each of the parties PARTY[i] has a respective input value A[i] that it wishes to keep secret from all other entities (other parties, nodes, the central entity, any other external system, etc.), but that the central entity wants to be able to determine the sum $S=A[1]+A[2]+\ldots+A[N]$.

In the illustrated example, for K nodes, each party represents its value A[i] in any chosen manner into K addends A[i][1], A[i][2], ..., A[i][K], that is, such that $A[i]=A[i][1]+A[i][2]+\ldots+A[i][K]$. For example, party PARTY[1] may decompose its value A[1] into K addends A[1][1], A[1][2], ..., A[1][K] such that $A[1]=A[1][1]+A[1][2]+\ldots+A[1][K]$. Note that there is no requirement for values A[i][j] to be integers or even positive numbers. Note also that, in other embodiments described below, there need not be a 1-to-1 relationship between the number of shares and number of nodes, and the number of shares created by each party need not be same.

Each party i (i=1, ..., N) then transmits its K addends A[i][j] (j=1, ..., K) to the respective node j of the K nodes. Node j then computes an intermediate sum $S[j]=SUM(A[i][j])$, i=1, ..., N. For example, node NODE[1] receives the shares A[1][1], A[2][1], ..., A[N][1], which it then sums to form an intermediate sum S[1]. The K nodes then transmit their respective intermediate sums to the central entity 300, which then forms the global sum $S=S[1]+S[2]+\ldots+S[K]$, which is the sum of all shares of all the reporting parties. To maintain secrecy N should be greater than 2. For N=1, the sum S equals the only input and thus publishing the sum also reveals the input. For N=2, the sum is A[1]+A[2] and either party can recover the input of the other party by subtracting their own input from the sum S. In the absence of "conspiracy" between any of the parties (revealing their respective A[i] values to each other), N>2 will typically be sufficient to maintain secrecy. As long as at least two nodes are not conspiring with any other, secrecy may be maintained for all non-conspiring nodes.

In the general case, the number of nodes need not be the same as the number of parties. In some implementations, however, each party may wish to maintain one of the nodes, which it then can monitor and trust not to conspire with others. In such a case, K=N. For example, each of several different companies that are parties might prefer to use one of its own servers as at least one trusted node, which the other parties are able to access for submission of addends.

A bulletin board 400 may be included to which parties and nodes can post authenticated messages in such a way that all other parties and nodes are guaranteed to see the same set of messages. The bulletin board 400 may be implemented and configured in many different ways. For example, it could be a file, database, or other data structure stored in the central server 300 itself, or some other server or site chosen for the purpose, and to which all entities are given either open access or access via credentials (such as user ID/password or the like). The bulletin board 400 may also be implemented using a blockchain, such as the system implemented using Guardtime KSI technology (see below), or a process and data structure that enforces a rule of allowing only one commitment (data entry) per party per round (if such a rule is desired), and preferably with no split view of the data structure.

Observe that the arrangement shown in FIG. 1 also protects each party's contribution A[i] against hacking by a malicious actor of the nodes 200, since no node will have this value.

Hash Function Embodiment

This embodiment improves on the previous, basic embodiment through the use of hashing. As is known a collision-resistant hash function H has the property that it is computationally infeasible to find two inputs $X1$ and $X2$ such that $H(X1)=H(X2)$ if $X1 \neq X2$.

Figure 2:
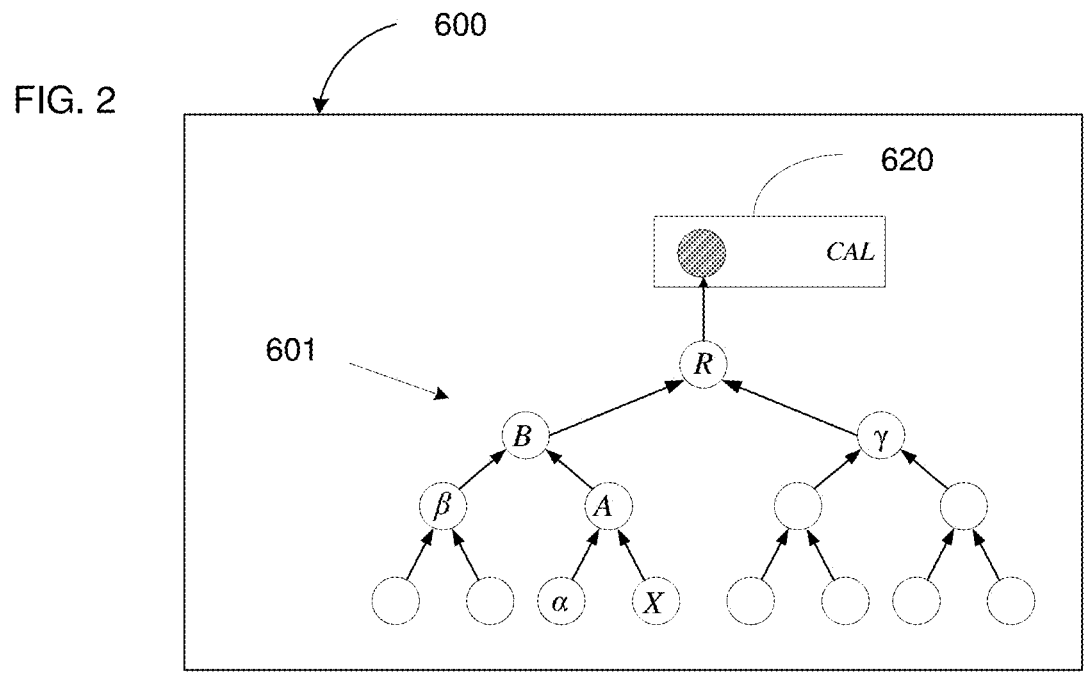
FIG. 2 illustrates a hash tree used to create hash chains.

It is then possible to aggregate M inputs into a "hash tree" so that, given the value in the root node of a tree, the membership and position of a leaf of the tree can be proven/verified with a chain of $\log_2(M)$ hash values. FIG. 2 illustrates these concepts, in particular, a hash tree 601, and how a "hash chain" may be used to verify an input data set given the root R of the hash tree.

The data set may be any kind of information that can be represented digitally. First, assume that different data sets are to form the lowest-level input "leaves" to the hash tree 601 during a given aggregation period, which may be fixed, such as every second, or variable, for example, covering the time it takes for all inputs to an aggregation round to be available. By way of simplified example, FIG. 2 shows eight such input as the circles at the base of the hash tree, two of which are labeled a and X.

In the hash tree representation, each "circle" represents the hash value of the two values input into it from below. Thus, $A=hash(\alpha, X)$, and so on, and the circle labeled R represents the top-level hash computation for the tree, here, $R=hash(B, \gamma)$. Any hash function may be used, although known cryptographic hash functions such as the SHA-256, SHA-512, etc., offer a well-studied, high level of security. If the hash function at every level is known (for example, they are all the same, which is the usual choice, without loss of security) and $\alpha$, $\beta$, and $\gamma$ are also known, one can compute the root value R given X by iterative hashing, since $R=hash(hash(hash(\alpha, X), \beta), \gamma)$. The values $\alpha$, $\beta$, and $\gamma$ thus define a "path" or "chain" or "signature vector" $(\alpha, \beta, \gamma)$ through the hash tree from the input X to the root R.

Note that no values in the sub-trees below $\beta$ or $\gamma$ are needed to form the hash chain for X. In applications in which not even the immediate "sibling" input should be known (for example, the user who inputs X should not be allowed to know even the input $\alpha$), it is also possible to input a hash of the input value (for example, hash(X) and hash($\alpha$) instead, thereby concealing the "raw" data. Moreover, other data may be hashed along with the raw data to form an input to the hash tree. For example, X might include not only the corresponding raw data, but also metadata such as a user ID, a serial or index number, etc., or even a completely random number included just to increase the entropy of the input (known as a "blinding mask").

Now assume that a record X* is presented as being identical to X. This can be proven or disproven by applying the same signature vector to X*: X*=X iff hash(hash(hash($\alpha$, X*), $\beta$), $\gamma$)=R.

One particularly advantageous infrastructure for generating digital signatures for digital inputs, is the distributed the hash tree infrastructure (the "Guardtime infrastructure") that has been developed by Guardtime As of Tallinn, Estonia. This system is described in U.S. Pat. No. 8,719,576 (Buldas, et al., "Document verification with distributed calendar infrastructure") and is incorporated herein by reference, but may also be summarized as follows.

FIG. 2 also serves to summarize the Guardtime signature technique: for each of a sequence of calendar periods (typically related one-to-one with physical time units, such as one second), the Guardtime infrastructure takes digital input records as inputs. These are then cryptographically hashed together as described above in an iterative, preferably binary hash tree 601, ultimately yielding an uppermost hash value (the "calendar value" CAL 620) that encodes information in all the input records.

As FIG. 2 illustrates, the calendar value for each calendar period may be the root value R of the "basic" hash tree. The infrastructure then returns a signature in the form of a vector, including, among other data, the values of sibling nodes in the hash tree that enable recomputation of the calendar value if a purported copy of the corresponding original input record is in fact identical to the original input record. Continuing with the example shown in FIG. 2, the signature for X could be $(\alpha, \beta, \gamma, CAL)$. Note that, given this signature, one can test whether X*=X simply by computing hash(hash (hash($\alpha$, X*), $\beta$), $\gamma$) to see if this =CAL, without having to rely on an external computation system, without having to trust a certificate authority that issues PKI (public key infrastructure) public/private keys, and without having to store such key pairs.

For additional security, in one version of the Guardtime infrastructure, each calendar value CAL is mathematically combined with previous calendar values by means of a growing Merkle hash tree, whereby a top-level hash value is formed for the calendar values themselves. The Guardtime signatures returned to entities can then be extended after a number of calendar periods up through a progressively growing Merkle tree of calendar values, or a hash-chaining of calendar values, to a top-level publication value that is published in any widely witnessed manner, such as in a printed publication, an online database, in a ledger, in a blockchain, etc. It is also possible to forego the accumulation of calendar values via a Merkle tree and instead enter each calendar value into some widely witnessed data structure such as a blockchain-backed ledger; indeed, the Guardtime KSI calendar itself has a structure that may be characterized as a blockchain, and may itself be sufficient even without additional hashing using a Merkle tree and publication.

In the Guardtime infrastructure, each calendar value CAL is computed according to a known time relationship, such as once per second. One consequence of this is that each signature will also be able to function as an irrefutable timestamp. FIG. 2 thus shows a system 600, corresponding to the signature/timestamping Guardtime infrastructure, to which any of the entities 100, 200, 300, 400 may submit values to obtain corresponding signatures and timestamping. Although the advantages of Guardtime signatures as hash chains are clear, it would also be possible to use any other known hash chain-generating infrastructure as well.

Figure 3:
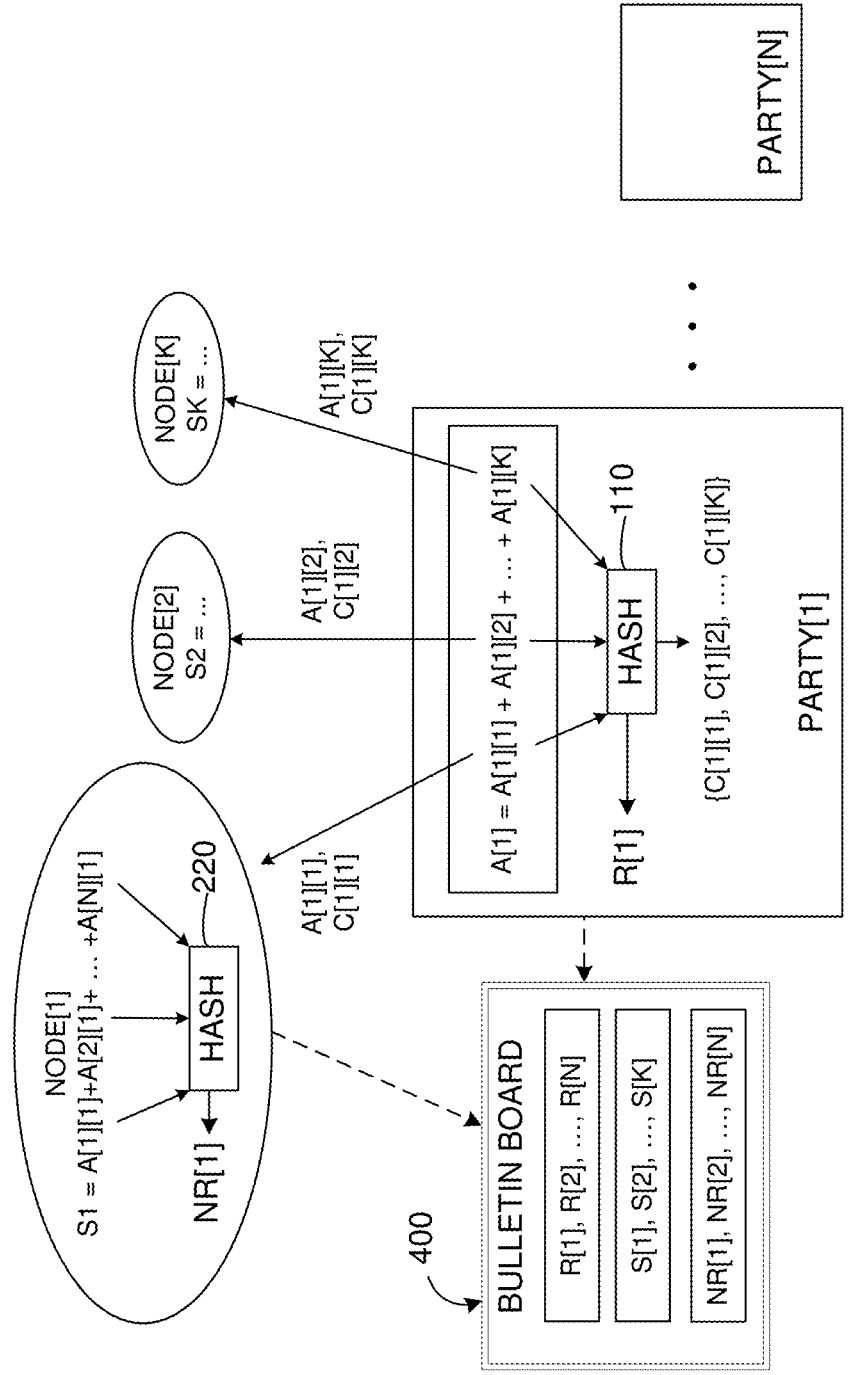
FIG. 3 illustrates an embodiment that uses hashing.

Now see FIG. 3, which illustrates an embodiment in which hashing is employed. In FIG. 3, the operations only of party PARTY[1] are illustrated, for the sake of ease of visualization; the other parties will interact with the nodes analogously.

In this embodiment, again, each party i represents its input A[i] into a sum of K shares: A[i]=A[i][1]+A[i][2]+ . . . +A[i][K]. The shares are then aggregated into a hash tree, which computes the root R[i]=TREE(A[i][1], A[i][2], . . . , A[i][K]). For each share, that is, each "leaf" of the hash tree, there will be a set/vector of values (typically, the "sibling values") that define the chain leading from this leaf value to the respective root. This is described above—see the chain/"signature vector" ($\alpha$, $\beta$, $\gamma$) for the input X in FIG. 2. For each share A[i][j], let C[i][j] represent its chain.

In FIG. 3, a module 110 is included within each party to take the share values, hash them pairwise (or in groups of three for ternary trees, or in larger groups for higher-degree hash trees) and iteratively as hash tree "leaves", compute a corresponding root R[i], and thereby create hash chains from each share value to the root.

Each party i:
posts its computed root R[i] to the bulletin board 400 for other parties and entities to see. Use of the hash tree to form R[i] thus reduces the amount of data that each party needs to post and expose on the bulletin board while still enabling subsequent auditability of its share values.
sends each share A[i][j], along with the hash chain C[i][j] linking it to R[i], to the node NODE[j]

Each node j:
upon receiving a share A[i][j] and the hash chain C[i][j] from the party i, uses the hash chain to verify (typically, by recomputation to the respective root value, given the sibling values in the chain) that the received A[i][j] was indeed the value in the j-th leaf of the tree whose root is the posted R[i];
upon collecting all N shares A[1][j], A[2][j], . . . , A[N][j]:
computes its share of the sum S[j]=A[1][j]+A[2][j]+ . . . +A[N][j]; and
posts the share S[j] to the bulletin board for all others to see Any interested party or entity that can access the bulletin board 400 may then, upon seeing all K shares of the sum S on the bulletin board, compute the final sum S=S[1]+S[2]+ . . . +S[K]. The central entity 300 may be the interested entity, in which case it may compute the sum S as in the basic embodiment, but, in this embodiment, any other party that has access to the information in the bulletin board may do so as well.

For this embodiment, the correct operation of each party can be verified by an independent auditing entity 1000, by the central entity, etc., after establishing what the correct value of A[i] should have been, by checking that the K shares A[i][1], A[i][2], . . . , A[i][K] indeed add up to A[i]; and that the K shares A[i][1], A[i][2], . . . , A[i][K], when aggregated into a hash tree, indeed result in the posted R[i].

To enable this auditing procedure, each party should either keep or be able to re-create the division of its input A[i] to the addends/shares.

The correct operation of each node can also be verified by an independent auditor: First, the auditor 1000 verifies that the node has accepted only valid messages from the parties, and it then verifies that each node has correctly computed and posted its share for the sum. Use of hash chains (or other data structure, such as is described below) to check for agreement with a posted value R[i] is a preferred method because of both its security and its computational and administrative efficiency. To enable this aspect of auditing, each node must keep all received messages.

In some cases, it may also be so that an auditor wishes to audit the operation of nodes as well as, or instead of the parties. As FIG. 3 illustrates, it may then also be possible to include a hashing module 220 within each node. (Only node 1 is show with this module, for the sake of drawing simplicity.) The hashing module 220 may then input the received share values A[1][1], A[2][1], . . . , A[N][1] and apply them as input "leaves" for calculation of a hash tree, as described above, producing, for each node j, a corresponding node root value NR[j], which may then be stored in the bulletin board 400. Hash tree chains may also be computed and stored for each leaf value within the node as well. A node may then be audited as described above for a party.

Asymmetric Encryption Embodiment

An encryption scheme in general consists of an encryption function ENC and corresponding decryption function DEC such that, knowing the encryption ENC(k, X) of some value X under the key k, it is computationally infeasible recover the value X without knowing the key. In an asymmetric encryption scheme the encryption key EK is different from decryption key DK and it is computationally infeasible to derive DK from EK. It is therefore possible to publish the encryption key EK so that anyone can encrypt any value X by computing Y=ENC(EK, X), but only the holder of the decryption key DK can compute DEC(DK, Y) and recover X.

Figure 4:
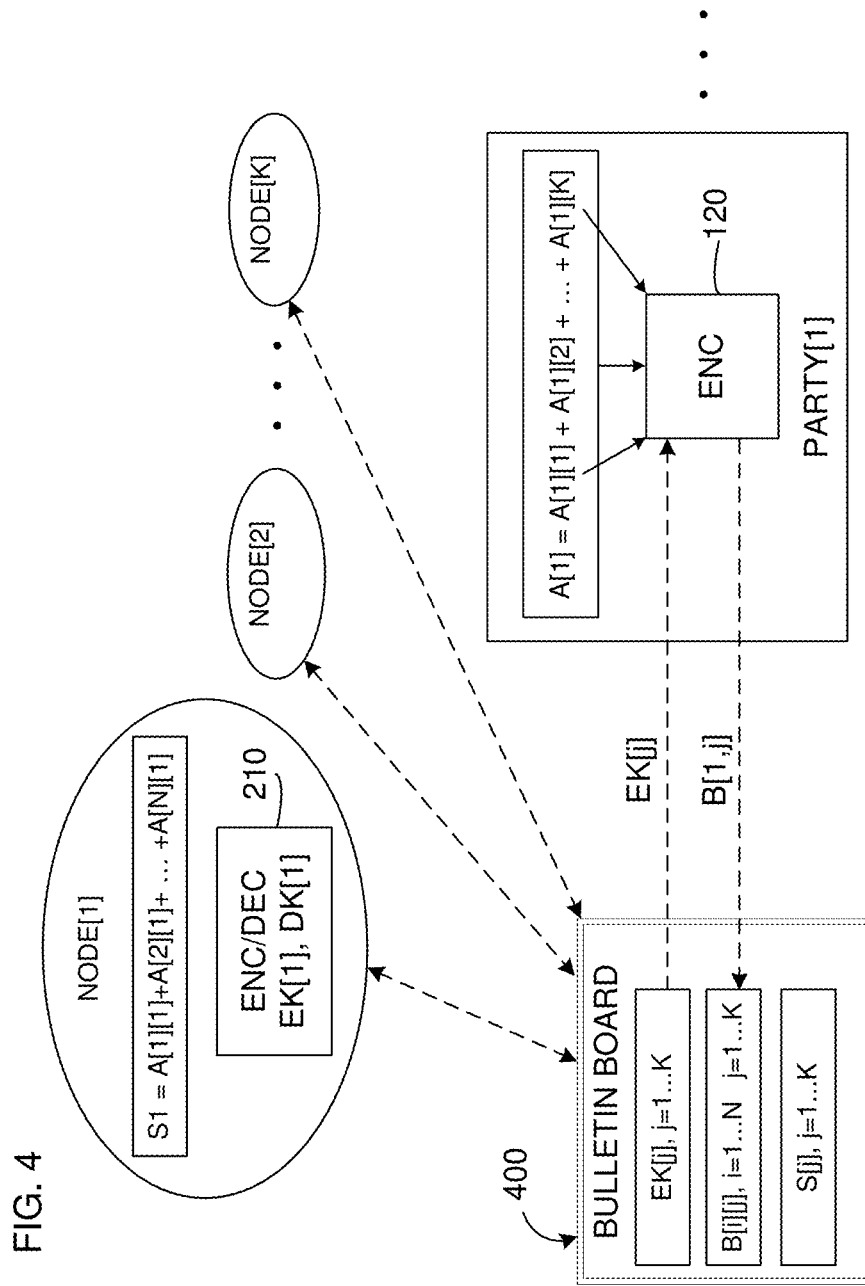
FIG. 4 illustrates an embodiment that uses encryption and decryption.

See FIG. 4. In this embodiment, each node j first generates a key pair (EK[j], DK[j]), for example, in a corresponding software component 210. (This is shown only for NODE[1] for simplicity; other nodes will be configured analogously.) It then posts the encryption key EK[j] on the bulletin board 400 for others to access, in particular, the parties PARTY[i]. Note that this is a one-time setup; the same keys can be used to compute many sums.

Use of the bulletin board 400 eliminates the need for each node to directly communicate its encryption key to each of the parties, but this would be a possible alternative arrangement. In fact, in this embodiment, use of the bulletin board, as a common communication portal, eliminates the need for direct communication between parties and nodes altogether.

Each party i then:
as before, represents its input A[i] as a sum of K shares: A[i]=A[i][1]+A[i][2]+ . . . +A[i][K]
encrypts each share with the encryption key of the corresponding node, for example, using a corresponding computation component or routine 120: B[i][j]=ENC(EK[j], A[i][j])
posts the encrypted shares B[i][1], B[i][2], . . . , B[i][K] to the bulletin board 400 for others to see Each node j then, upon seeing all N encrypted shares B[1][j], B[2][j], ..., B[N][j] on the bulletin board:
  decrypts the shares A[i][j]=DEC(DK[j], A[i][j])
  computes its share of the sum S[j]=A[1][j]+A[2][j]+ ... +A[N][j]
  posts the share S[j] to the bulletin board for all others to see As before, any interested party or entity that can access the bulletin board 400 may then, upon seeing all K shares of the sum S on the bulletin board, compute the final sum S=S[1]+S[2]+ ... +S[K].

For this embodiment, the correct operation of each party can be verified by an independent auditor, after establishing what the correct value of A[i] should have been, by checking that the K shares A[i][1], A[i][2], ..., A[i][K], when encrypted with the encryption keys of the nodes, indeed result in the posted B[i][1], B[i][2], ..., B[i][K]. Note that, to enable this auditing procedure, each party should either keep or be able to re-create the division of its input A[i] to the addends/shares.

The correct operation of each node can also be verified by an independent auditor: The auditor asks the node to decrypt the shares B[1][j], B[2][j], ..., B[N][j] to recover A[1][j], A[2][j], ..., A[N][j] and then verifies that they add up to the posted S[j].

Semi-Homomorphic Encryption Embodiment

In this embodiment, the encryption method is chosen to be additively semi-homomorphic and thus has the property, in addition to the encryption and decryption functions described above, that SUM(ENC(EK, X), ENC(EK, Y))=ENC(EK, X+Y). In other words, given the encryptions ENC(EK, X) and ENC(EK, Y) of two values X and Y, it is possible to compute the encryption ENC(EK, X+Y) of the sum X+Y without knowing X and Y themselves. Several existing semi-homomorphic asymmetric encryption schemes are known, among which are RSA and ElGamal.

In this embodiment, the actions of the parties and nodes are the same as described above for the Asymmetric Encryption Embodiment. This embodiment, however, provides a different method for verifying S[j]. In this embodiment, each interested party can verify the correctness of any S[j] on the bulletin board, and compute the final sum S as follows:
  compute the encrypted share ES of the sum from the posted encrypted shares as ES[j]=SUM(B[1][j], B[2][j], ..., B[N][j]);
  compute the encryption of the posted share of the sum D[j]=ENC(EK[j], S[j]);
  verify that the two match: ES[j]=D[j];
  upon seeing all K shares of the sum on the bulletin board, compute the final sum as in other embodiments: S=S[1]+S[2]+ ... +S[K].

In this embodiment, the correct operation of each party can be verified by an independent auditor, after establishing what the correct value of A[i] should have been, by checking that the K shares A[i][1], A[i][2], ..., A[i][K], indeed add up to correct value A[i]; and that the K shares A[i][1], A[i][2], ..., A[i][K], when encrypted with the encryption keys of the nodes, indeed result in the posted B[i][1], B[i][2], ..., B[i][K]. As before, to enable this auditing procedure, each party should either keep or be able to re-create the division of its input A[i] to the addends/shares.

Note that there is no need for specific auditing of the nodes, since any party can verify the correctness of their operation in real time as they post their shares S[j] to the bulletin board.

Hash Function and Semi-Homomorphic Encryption Embodiment

In this embodiment, both collision-resistant hashing and additively semi-homomorphic asymmetric encryption are used. See FIG. 5, in which, as before, the operations and components of only one of the parties and one of the nodes are illustrated merely for the sake of simplicity; other parties and nodes may be structured and operate analogously.

As before, each node j first generates a key pair (EK[j], DK[j]) and posts its encryption key on the bulletin board 400.

Then, each party PARTY[i]:
  represents its input A[i] as a sum of K shares: A[i]=A[i][1]+A[i][2]+ ... +A[i][K];
  encrypts each share with the encryption key of the corresponding node, B[i][j]=ENC(EK[j], A[i][j]);
  aggregates the encrypted shares into a hash tree, computing the root R[i]=TREE(B[i][1], B[i][2], ..., B[i][K]); As before, this may be done internally, in a component 110, or by using an external system 600;
  posts the R[i] to the bulletin board for all others to see;
  sends each encrypted share B[i][j], along with the hash chain C[i][j] linking it to R[i], to the node j.

Thereafter, Each node j, upon receiving an encrypted share B[i][j] and the corresponding hash chain C[i][j] from the party i:
  uses the hash chain to verify that the received B[i][j] was indeed the value in the j-th leaf of the tree whose root is the posted R[i];
  decrypts the share A[i][j]=DEC(DK[j], B[i][j]);
  upon collecting all N shares A[1][j], A[2][j], ..., A[N][j]:
    computes its share of the sum S[j]=A[1][j]+A[2][j]+ ... +A[N][j];
    posts the share S[j] to the bulletin board for all others to see.

As before, any interested party or entity that can access the bulletin board 400 may then, upon seeing all K shares of the sum S on the bulletin board, compute the final sum S=S[1]+S[2]+ ... +S[K].

For this embodiment, the correct operation of each party can be verified by an independent auditor, after establishing what the correct value of A[i] should have been, by checking that the K shares A[i][1], A[i][2], ..., A[i][K], when encrypted with the encryption keys EK[j] of the nodes and aggregated into a hash tree, indeed result in the posted R[i]. As before, to enable this auditing procedure, each party should either keep or be able to re-create the division of its input A[i] to the addends/shares.

The correct operation of each node can also be verified by an independent auditor: First, the auditor 1000 verifies that the node has accepted only valid messages from the parties, such as by use of hash chains to check for agreement with a posted root value R[i]. The auditor then verifies that the node has correctly computed its share for the sum as follows:
  compute the encrypted share of the sum from the received encrypted shares as ES[j]=SUM(B[1][j], B[2][j], ..., B[N][j]);
  compute the encryption of the posted share of the sum D[j]=ENC(EK[j], S[j]); and
  verify that the two match: ES[j]=D[j].

This auditing process assumes that the node being audited has kept all received messages. On the other hand, in this embodiment, the auditor never sees the plaintexts of the input shares the node received from the parties.

End of Round

In the description of the embodiments above, at least with respect to some operations, it is stated that each node j will be able to collect all N shares A[1][j], A[2][j], ..., A[N][j], or can derive all N of these from decryption. If all parties report all K respective shares quickly, this will generally not be a problem. This may, however, not always be so, either through deliberate failure of a party to participate completely or at all, or inadvertently, for example because of lack of network connection, unavailability of an input A[i], etc. There thus may be a need to define some limit for a "round" that is, a period during which share values are accepted by the nodes (directly, or via the bulletin board) for summation (or other operation) to form the respective node values S[j].

One method for handling this eventuality is a time cut-off: The central entity (or some other superior entity, or via agreement among the nodes) sets a cut-off time tend. The nodes then form their values S[j] from whichever share values (plain or encrypted) they have received by tend and pass these values on to the central entity (and/or bulleting board) for aggregation into a global total value.

Another option would be to set a minimum number of parties to collect values from, or a minimum number of shares, possibly also with a time cut-off, and the nodes then perform their usual operations based on the shares they have received. This arrangement might be useful in cases in which there is a large number of parties and the inputs of only some sub-set form a sampling that is sufficient for statistical purposes.

If all shares for one party are omitted, the result is a sum of the inputs of the remaining parties and could still be useful. In some cases, it will be preferred to process only "complete" sets of shares for parties. If, for example, only one share from one party is not properly received, it will cause an error of unknown size in the final sum S. This may be acceptable if there is a large number of parties and total accuracy is not required, such as for sampling; otherwise, any chosen error-handling method may be applied, such as that the entire process is aborted, or that the nodes first agree on the subset of parties from which they all have shares, and then compute the sum over only those, or that a final sum is computed from whatever inputs have been received, etc.

Alternative Decompositions

In the description of various embodiments above, it is stated that shares, encrypted values of shares, intermediate node values S[j], etc. are summed to yield some intermediate or final value. For example:

$A[i]=A[i][1]+A[i][2]+\ldots+A[i][K]=\Sigma_{j=1}^{K}A[i][j]$ $S[j]=A[1][j]+A[2][j]+\ldots+A[N][j]=\Sigma_{i=1}^{N}A[i][j]$ $ES[j]=SUM(B[1][j],B[2][j],\ldots,B[N][j])=\Sigma_{i=1}^{N}B[i][j]$ $S=S[1]+S[2]+\ldots+S[K]=\Sigma_{j=1}^{K}S[j]$ and so on.

Decomposing each party's value A[i] into addends is, however, not the only possibility. Instead of summation of addends, for example, it would be possible to implement multiplication of multiplicands. In other words, each party could decompose its value into factors (integer or otherwise). In this case:

$A[i]=A[i][1]\times A[i][2]\times\ldots\times A[i][K]=\Pi_{j=1}^{K}A[i][j]$ $S[j]=A[1][j]\times A[2][j]\times\ldots\times A[N][j]=\Pi_{i=1}^{N}A[i][j]$ $ES[j]=SUM(B[1][j],B[2][j],\ldots,B[N][j])=\Pi_{i=1}^{N}B[i][j]$ $S=S[1]\times S[2]\times\ldots\times S[K]=\Pi_{j=1}^{K}S[j]$ In embodiments that use semi-homomorphic encryption, any of the known routines for multiplicatively semi-homomorphic asymmetric encryption may then be applied. The various operations of posting values to the bulletin board 400 will then not need to change and other operations may be carried out as described.

Embodiments arranged to form the final result S from products of parties' shares may be useful in situations where each party's value A[i] represents, for example, a probability, or percentage, or fraction of some quantity that is to be combined multiplicatively with the values of other parties.

More generally, different embodiments may be adapted to enable computation of a final result S using any operation $\otimes$ such that if $A[m]=A[m][1]\otimes A[m][2]\otimes\ldots\otimes A[m][K]$ and
$A[n]=A[n][1]\otimes A[n][2]\otimes\ldots\otimes A[n][K]$ for $n\neq m$,
then $A[m]\otimes A[n]=\{A[m][1]\otimes A[n][1]\}\otimes\{A[m][2]\otimes A[n][2]\}\otimes\ldots\otimes\{A[m][K]\otimes A[n][K]\}$.

In words, it should be possible to perform the operation on shares from different parties in the different nodes, then perform the operation on the results of the nodes, and get the same result that one would get by directly operating on the "undecomposed" party values. In any implementation that relies on semi-homomorphic encryption, an encryption routine should then be chosen such that it exhibits semi-homomorphism under the operation $\otimes$.

One example of an operation that satisfies these conditions is the integer ring under modular arithmetic, under both addition and multiplication. Thus, as is well known:

$(x+y)\bmod n=(x\bmod n)+(y\bmod n)$; and $(x\times y)\bmod n=(x\bmod n)\times(y\bmod n)$ The values A[i] of the different parties may then be intended is to contribute as terms/multiplicands to a global value, modulo n, that is, $S=(S[1]\otimes S[2]\otimes\ldots\otimes S[K])\bmod n$ Such a global value might, for example, be used as a commonly generated, computationally verifiable key by the parties, to which each party will have contributed a term (thereby not requiring total trust of outside entities alone), but in a way that the global value cannot be easily decomposed into its constituent terms because of unknown contributions of the other parties.

Such an embodiment may also be useful in scenarios involving random selection of a "winner", such as in games or in cryptocurrency mining routines: Each participating party may generate a value A[i] as above, decompose it into addends or factors (or other operands) and submit these for computation in the central entity 300 of a global final value S. The party p whose individual value A[p] comes closest, for example, to the global value mod n, could then be designated the "winner" of the round. A[p] would, as above, remain unknowable by other parties during the distributed aggregations and computations in the nodes, but could be revealed after the final result S has been produced.

Choice of Shares

Regardless of the operation $\otimes$ to be applied, the parties must choose, or implement, some way to decompose their respective inputs A[i] into shares. Many different ways are possible.

One option is to generate the shares randomly from the full range of the underlying data type. For example, when working with M-bit unsigned integers, each party i may generate the first K−1 shares A[i][1], A[i][2], . . . , A[i][K−1] as uniformly chosen random numbers in the range 0 . . . $2^M-1$ and compute the last share A[i][K] such that the sum A[i][1]+A[i][2]+ . . . +A[i][K], when computed modulo $2^M$, equals the input A[i]. This ensures the final share A[i][K] also has uniform distribution over the range 0 . . . $2^M-1$ and thus does not leak any information about the input A[i].

When working with M-bit signed integers, the first K−1 shares may be chosen uniformly from the range $-2^{M-1}$ . . . $2^{M-1}-1$, with the last one chosen such that the sum equals A[i], modulo $2^M$, with the same security properties as in the previous case. Similar considerations can also be applied when working with fixed-point and floating-point values.

As yet another alternative, a party may choose share values more deliberately, for example, choosing to report a relatively low value to one or more nodes while reporting higher values to other nodes. In other cases, a party may want to choose the number and/or size of shares to correspond to some "natural" grouping for purely internal administrative purposes, such as by manufacturing batch or date, color, size, model, etc., without reporting this to nodes or other entities. There is in practice little limit on how a party may choose to decompose its input value A[i] into shares, although some choices may provide more secrecy than others.

For operations other than summing, similar techniques may be applied. For example, in the case of shares being formed as multiplicands, all but a final share value could be chosen randomly to be non-zero and within some range, with the final share value being the total input value A[i] divided by the product of the values already chosen. When computing products of integers, it would be advisable to perform the computations modulo a sufficiently large prime number P so that the first K−1 (for example) shares can again be chosen uniformly randomly and their product is guaranteed to have a multiplicative inverse, such that a suitable value exists for the final share of A[i]. Known techniques may then be applied to deal with any rounding if floating-point operations are involved.

Shamir's Secret Sharing

As explained in several references, for example, A. Shamir, "How to share a secret," Communications of the ACM, vol. 22, no. 11, pp. 612-613, 1979, Adi Shamir proposed a secret sharing scheme in which a secret input A can be split into K shares in such a way that any subset of M or more shares can be combined to reveal the input, but any subset of less than M shares leaks no information about the input. The Shamir method is yet another option for creating shares, and for the operations used to yield a global value S, for example, in the central entity. To achieve this, the owner of the input (usually called the dealer in literature on such schemes) generates a polynomial of degree M−1, $P(x)=c[0]+c[1]*x+c[2]*x^2+ \ldots +c[M-1]*x^{Mm-1}$, where c[0]=A and the remaining c[i] are random numbers. Next the dealer picks K distinct non-zero values X[1], X[2], . . . , X[K] and computes the shares as s(X[1]), s(X[2]), . . . , s(X[K]). It is obvious that s(0)=c[0]=A, so anyone who can reconstruct the polynomial will also be able to recover the value A. It is well known from algebra that given M distinct points on the curve of P(x), the polynomial can be recovered, but given just M−1 points, there is an infinite number of polynomials whose curves pass through all the given M−1 points, but intersect the Y-axis at different points.

In general, when multiple inputs are split into shares in this way, the shares from different inputs can't be usefully combined. However, under additional restriction that the same values of X[j] have to be used for all inputs (for example, always taking X[1]=1, X[2]=2, . . . , X[K]=K), then the scheme becomes additively homomorphic. Indeed, with N inputs A[1], . . . , A[N] each independently split into polynomials $PARTY[i](x)=c[i][0]+c[i][1]*x+c[i][2]*x^2+ \ldots +c[i][M-1]*x^{M-1}$, and the values A[i][j]=PARTY[i](X[j]) distributed to the nodes as before, each node j can compute and publish S[j]=A[1][j]+A[2][j]+ . . . +A[N][j] and any M-element subset of the shares S[j] will allow recovery of the polynomial P(x)=PARTY[1](x)+PARTY[2](x)+ . . . +PARTY[N](x), and then P(0) will reveal the sum of inputs.

Composition Instead of Decomposition

In the description above of various embodiments, it is assumed that each party represents its input A[i] as an operation on a set of shares, for example, the sum A[i]=A[i][1]+A[i][2]+ . . . +A[i][K]. In many cases, this will be a decomposition of A[i] into addends (or corresponding elements, depending on the operation involved). In other words, the party starts with a known value A[i], which is wants to report yet still conceal, so it breaks it into components, that is, shares A[i][j].

In some other implementations, however, a party may not be the lowest level entity in the system, but rather may itself collect and aggregate values that it has received from other entities. As just one example, assume that an entity receives K payments from customers and donors, that it must keep a record of these individual payments, but that it must report only a total received amount to a central authority, while wishing to keep this total amount secret from competitor. In other words, in this scenario, a party may be willing to reveal its shares A[i][j] individually to different, respective nodes, but not its total A[i]. In this case, A[i][1] . . . A[i][K] are the given values (shares) and may be summed (or other operation applied) to yield A[i]. The embodiments described above may still be used as described.

Of course, it will not always be the case that a party will receive K values, or the same number of values as other parties. In general, even for the embodiments described above, it may not always be so that all the parties decompose (or compose) their respective inputs A[i] into the same number of shares. Mechanisms for dealing with this possibility are described elsewhere in this specification.

Signatures

Digital signatures may optionally be used for different values, or sets of values, in the various embodiments; signatures may in many cases aid in the auditing and/or verification processes. If the signatures also encode time (such as a Guardtime KSI signature), then they may also form an irrefutable timestamp. Essentially, a digital signature, in particular, a Guardtime KSI signature, will irrefutably "seal" a value (including vector) both with respect to the value itself and with respect to time, in the sense that any change will be detectable.

Any of the values, or sets of values, used in the different embodiments may be digitally signed if this is desired in a kind of "maximum auditability" implementation. For example, in embodiments that involve inputting shares into a hash tree to form a root value R[i], it may be advantageous to digitally sign that root value R[i], thereby anchoring it to another auditable record and, if the signing is done using the Guardtime KSI system (see system 600 in FIG. 2), to time as well. Similarly, the state of all or any portion of the data posted in the bulletin board 400 may also be digitally signed and/or timestamped, for example, at the end of each aggregation round, or even after each change of state, such as after every addition to any of the data structures (such as for EK[ ], B[ ], R[ ], S[ ], etc.), as may be the collection of node output values S[j] and/or final value S within the central entity.

Registration

Before a node can know that it is to receive N share values from the N parties, it must, at least in some embodiments, be made aware that there are N participating parties. In some implementations, the central entity 300 will know which parties it wishes to collect and aggregate share information from. For example, a public health ministry may know from which pharmacies it wants information regarding vaccine inventory, or a regional distributor may want to compile stock information from certain retailers. In these cases, the central entity may contact the parties (that is, their computing systems) and instruct or request them to register. The central entity may send, for example, the network addresses to the nodes to which each party is to report shares (and thus the number K), to the bulletin board, and to any other relevant entities, as well as administrative information such as access codes, time limits, information identifying what values the parties are to report, etc. Each party may then acknowledge the task and information. During any inter-entity network communication, identity verification may also be implemented, for example by using standard Public Key Infrastructure (PKI) techniques.

It would also be possible instead for the central entity to message the nodes information about the data that they are to accumulate. The nodes may then handle the task of communicating with one or more parties, exchanging necessary information, and then communicating this information to the other nodes, which may then communicate, for example, the network address of the nodes to "their" respective parties.

Still other alternatives are possible for establishing the information needed to begin the process of parties reporting their share information. One such additional alternative would be for the parties themselves to initiate participation in the data-reporting procedures. In this case, a party would signal to either the central entity or to one or more of the nodes that it wishes to participate. If approved, the superior entity could then respond with the necessary network addresses, possible assignment to nodes for reporting, etc.

Phantom Shares to Increase Entropy

Now consider again the basic embodiment illustrated in FIG. 1 but assume that, as part of pre-reporting communication by the central entity 300 to each party i, the central entity issues a respective, secret "phantom share" value PS[i]. The party i may then add this value to its input value A[i], to form A*[i]=A[i]+PS[i] and proceed as in any of the described embodiments except for decomposing A*[i] instead of A[i] into the K shares. The central entity may then determine the actual total share value S by subtracting the sum of all the N phantom share values PS[i] from the final value S* that the central entity computes from the sum of the node values S[i], that is, $$S = \Sigma_{j=1}^{K} S[j]) - \Sigma_{i=1}^{N} PS[i]$$

The central entity may choose the phantom share values in any manner. One example would be to choose the phantom share values as random numbers within some predetermined range. Another option would be to choose the phantom share values such that they sum to 0 (note that there is no requirement for a share value to be a positive integer), in which case there will be no need to subtract $\Sigma_{i=1}^{N} PS[i]$ from the sum of values received from the nodes.

In implementations that use decomposition into multiplicands instead of addends, each party's input A[i] may be multiplied with the assigned phantom share value, in which case the central entity would divide the result of multiplication of the S[i] values by the product of all the phantom share values, that is:

$$S = (\Pi_{j=1}^{K} S[j])/(\Pi_{i=1}^{N} PS[i])$$

This optional modification increases the entropy of the values reported by the parties such that, even if a malicious actor were to intercept all the share values sent from a party to the nodes, it would still not be able to determine what that party's actual total value A[i] is. This option may be useful in cases in which a party's input value A[i] may be too small to split into the requisite or chosen number of shares without using negative share values. Note that this embodiment would preserve the privacy of parties' inputs even with just one node, assuming the central entity and the node are not colluding.

Assigned Party Input Values

So far in the description, it has been suggested that each party has a value that is to be kept secret even from the central entity, which aggregates received values to derive a previously unknown global value S. This is not the only scenario. In some situations the central authority may know in advance what the global value S is, then decomposes it into pieces that are distributed to the respective parties, secretly, and then the parties need to submit them back, by way of any of the methods described herein. Such an embodiment could be used to implement, for example, multi-party authorization of some action, or to prove that all had participated in some process.

Rosters

Assume that each of K nodes NODE[j] is to receive a respective one of K shares from each of N parties. Each node may then maintain a simple N-element "roster" in which it indicates from which nodes it has received share values. This could be as simple as an N-bit word in which each bit corresponds to a node, a "1" indicates that a share value has been received and a "0" indicates the opposite, or any known data structure may be used to indicate which nodes have "reported". One such structure could be a list of party identifiers, which a party may send along with share values, which could be derived from the network address of the party, or otherwise. A node may then sum its received share values to S[j] when it has received all N values, but will be able to identify each node that has not sent a share value, for example, by some deadline. The node may then signal this failure to other nodes, and/or to the central entity, and/or to the node itself as a "reminder" or other type of notification. The nodes and/or central entity may then take any chosen remedial action, such as not completing the data accumulation round at all (where total compliance is required), computing S based on only the K values received by all nodes from fully compliant parties, computing S based on whatever share values have been received, even if not all have been received from a party, etc.

Figures 6A, 6B:
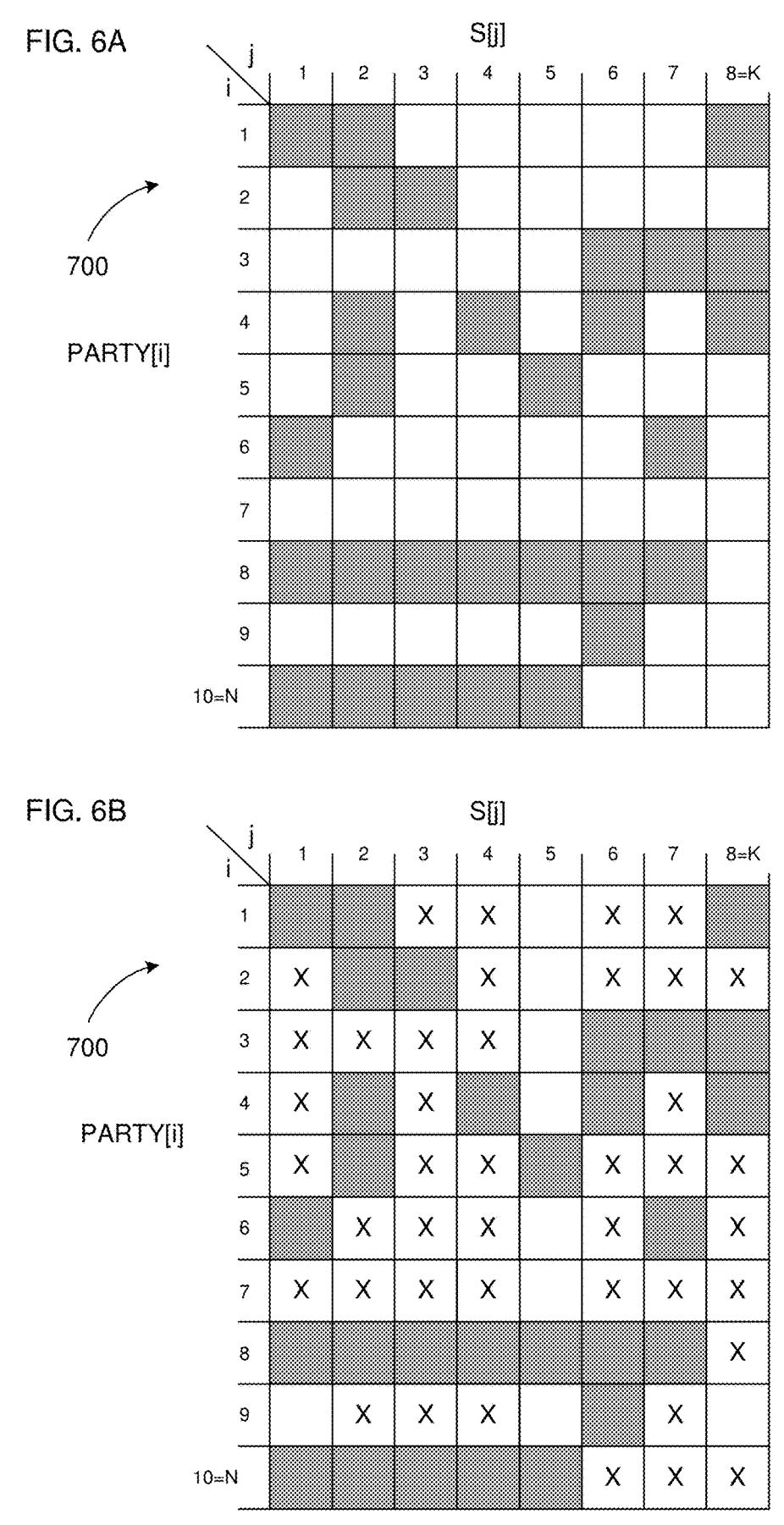
Figure 6C:
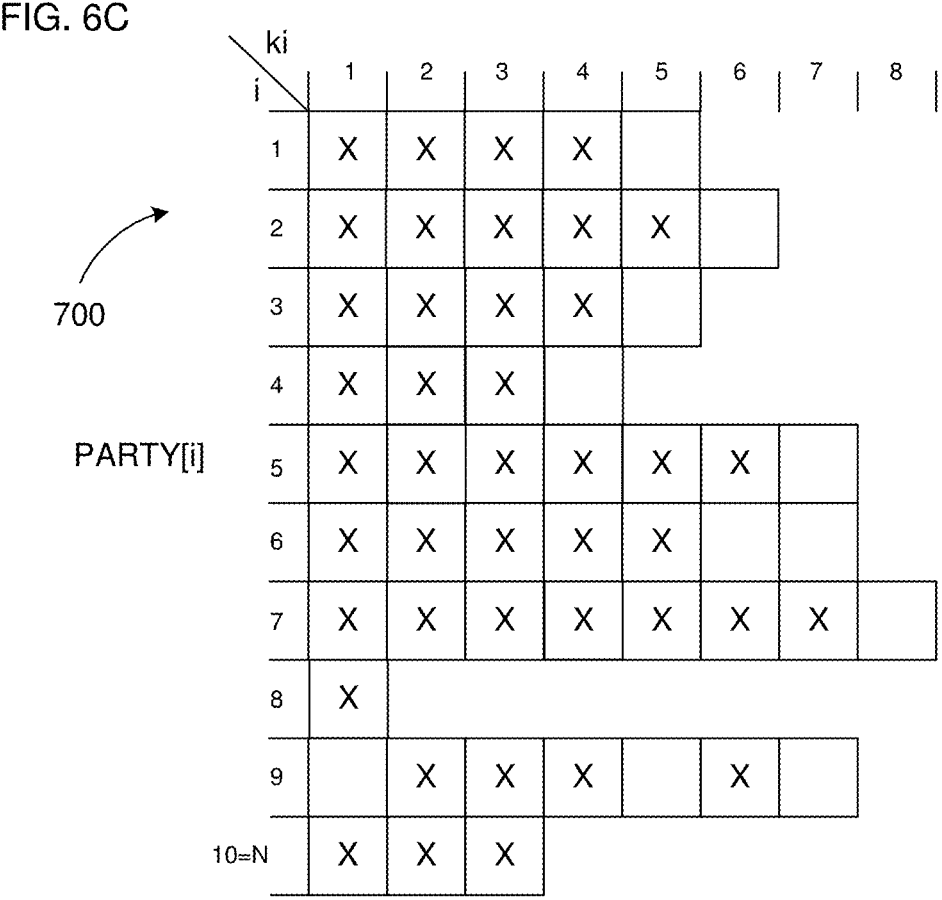

FIGS. 6A and 6B illustrate a form of roster 700, in this case a two-dimensional data structure, that may be used in not only the situation in which there are N nodes each reporting K shares to each of K nodes, but also other possibilities as well. The roster 700 may be established and maintained within the central entity 300, or as part of the bulletin board 400 (which may itself be within the central entity), or in some other entity with which the nodes can communicate. The roster 700 could also be maintained within any of the nodes, and/or duplicated and synchronized by more than one node.

In FIGS. 6A and 6B, each column corresponds to one of the K nodes and each row corresponds to one of the N parties; of course other data structures may be used to store and indicate the same information. In the illustrated case, there are eight nodes (K=8) and ten parties (N=10), although this is of course simply by way of illustration. In FIG. 6A, for each row, an unshaded cell indicates that the respective party is to send a share value to the node of the corresponding column; the row this indicates into how many shares the corresponding party will be decomposing its input value into. Instead of "a" common number K of shares, in these embodiments, each party will create k[i] shares, which may be the same for all parties, but may also differ. A shaded cell, however, indicates that the party is not going to report a share value to that node. For example, as illustrated in FIG. 6A, party PARTY[1] is to send share values to nodes 3-7 (five shares; party PARTY[2] is to send share values to nodes 1 and 4-8; party PARTY[7] is to send share values to all K nodes; and so on.

Note that party PARTY[8] is sending only a single share value, to node 8, which might be because that party PARTY[8] does not care about the extra security offered by "splitting" its input value into share values that are "distributed" to different nodes. This reduces the security of other parties, however, by making it possible to subtract off a single known value from an intercepted partial sum; in other words, allowing a party to create a single "share" reduces entropy and is therefore not preferable.

Now see the state of the roster 700 as illustrated in FIG. 6B, in which an "X" in a cell indicates that the respective Node S[j] has received a share value from the respective party PARTY[i]. This information may be reported to whichever entity maintains the roster at the designated end of a round (such as a time deadline), or in real time, as share values are received. Note that the actual share value received is not indicated in the roster 700, since this would cause party input values A[i] to be revealed by summing a complete row. For example, as illustrated, node 3 has received all the share values it was supposed to, that is, from Parties 1, 3-7, and 9, as has Node 2 (parties 3, 6, 7, and 9), node 3, node 4, node 6, and node 7.

On the other hand node 5 is not shown as having received any share values, which may indicate a failure of node 5 itself, or of its connection to the entity hosting the roster. The illustrated roster also indicates that party PARTY[9] has failed to send values to Nodes 1 and 8, in addition to whatever caused Node 5 not to report the share value A[9,5].

In the absence of a complete roster (all share values reported to all proper nodes), the central entity may take any chosen remedial action, as mentioned above, ranging from refraining from any S computation to simply computing S based on whatever S[j] values it has received, computing S based on only S[j] values from nodes whose indications (columns) are complete, etc. The central entity may also contact any nodes with incomplete roster indications, for example, to request retransmission, and/or to pass on a request for the node to query and request retransmission from any parties that have "missing" shares, etc.

The roster may be initialized in any chosen manner. One example would be for parties, upon initial registration with the central entity, to indicate how many shares they will submit, and, if not assigned by the central entity (an option), which nodes they will transmit share values to. This would enable the central entity to configure the roster (that is, the data structure that implements it) before the parties begin to transmit share values. One reason a party might wish to submit fewer than some fixed number K of shares, where K=the number of nodes, is that it may not wish or be allowed to establish network communication with one or more of the nodes at all.

Furthermore, the nodes might have some natural "grouping", such as geographic, such that parties in a region 1 may report only to the k[1] nodes in that region, parties in a region 2 report only to the k[2] nodes in that region, and so on. The central entity, or the respective regional nodes, may then communicate to the respective parties to which nodes they are to submit values, and this how many shares they should divide their respective input values into.

As an alternative, the information used to configure and complete the roster 700 could be conveyed as part of the share-reporting process itself. For example, assume that party i wishes to communicate to nodes how many shares it has created and which share it is sending to each node. Each transmission from a party to a node could then be in the form (or equivalent) of a set of data such as {ID[i], k[i], q, A[i][q]}, where ID[i] is an identifier of the party PARTY[i], k[i] indicates how many total shares party PARTY[i] is going to be transmitting, q is an index number indicating which share is being transmitted now, and A[i][q] is the actual share value. Thus, following this protocol, {ID[1], 6, 2, A[1][2]}, sent to node 4, would indicate that party 1 is transmitting the share value A[1][2] as the $2^{nd}$ of 6 total shares. As part of completing a round, the node j could then send to the central entity all of the subsets {ID[i], k[i], q}, along with its node sum S[j]; the central entity would then be able to construct the roster. This procedure would also be able to detect duplicate transmissions: If two different nodes report that they have received the q-th of k[i] share from party i, this would indicate a discrepancy that could trigger remedial action. The roster 700 in this embodiment may be configured as in FIG. 6C, in which, instead of S[j] identifiers, the columns indicate the k[i] values for the respective nodes, such that each row acts as a form of "tally" of transmitted shares. The roster shown in FIG. 6B would then appear as in FIG. 6C: party 1 has reported 4 out of 5 total shares; party 2 has reported 5 out of 6; and so on. This configuration would not easily detect that node 5 has failed to submit any values at all, but the cells of a roster configured as in FIG. 6C could be made three-dimensional by including, instead of just a marker ("X" in the figure), the number of the node that passed the respective cell information. The central entity may detect failure of a node more straightforwardly, however: It would not have received information from that node at all when the node was to submit its S[j] sum.

Alternatives to Hash Trees

Figure 5:
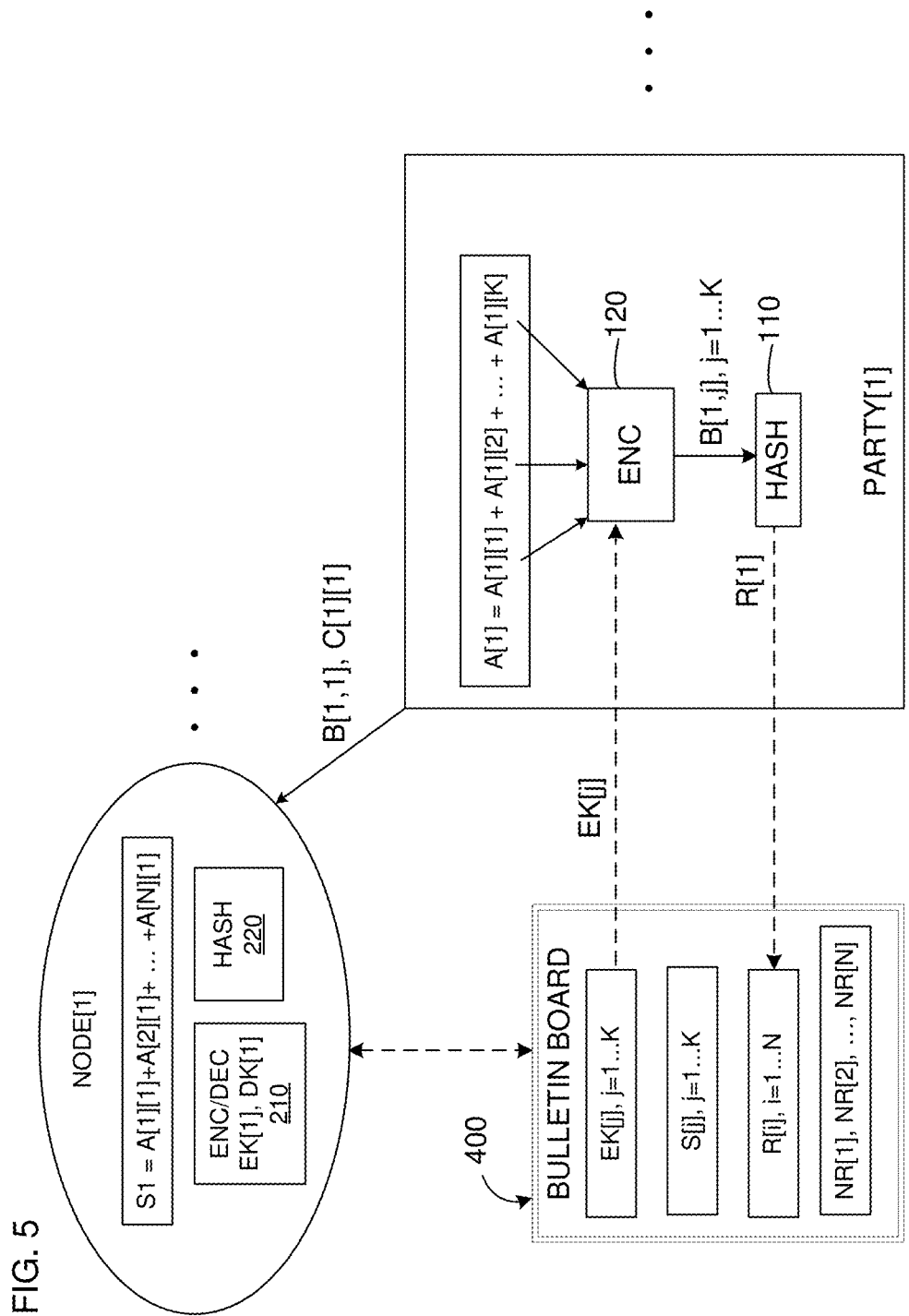
FIG. 5 illustrates and embodiment that uses both hashing and encryption/decryption.

FIGS. 2, 3 and 5, and the accompanying description, refer to the use of hash trees to aggregate sets of values into a single root value and, for each value, a unique corresponding value chain to that single root value. Hash trees are, however, just one option. In general, any multi-element data and/or computational structure that encodes all of a set of multiple input values (such as the share values A[i][j] for a party, or node input values S[i][j] for a node) to produce one or more output values that conceal the inputs and may be stored and used for validation may be used instead of hash trees.

Figure 7A:
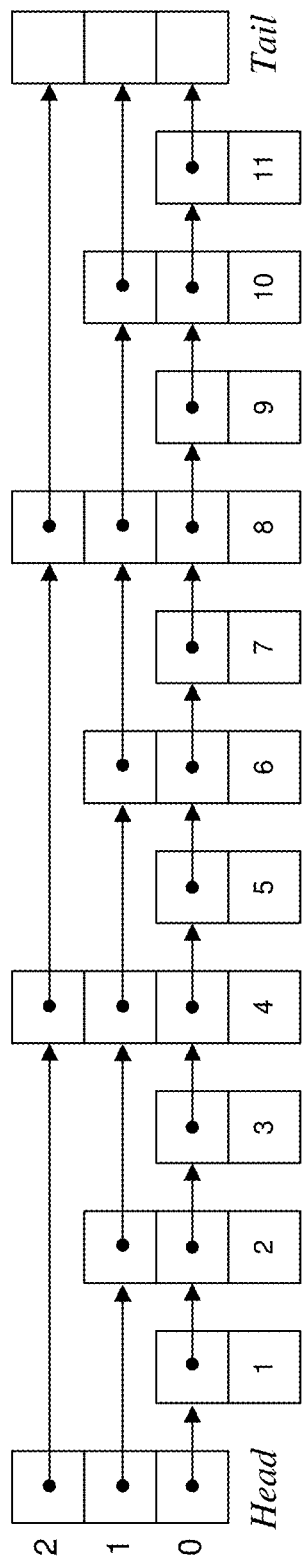
FIGS. 7A and 7B illustrate different concepts relating to a skip list.

One such alternative structure is a variation of a skip list, which is a well-known data structure first described in Pugh, William, "Concurrent Maintenance of Skip Lists", (Technical report), Dept. of Computer Science, U. Maryland, CS-TR-2222, (April 1989). See FIG. 7A. In summary, a skip list is a data structure that comprises a hierarchy of "layers" (in FIG. 7A layers 0, 1, 2, although any number may be included) of linked lists of ordered sequences of elements, each having an initial (Head) and final (Tail) value. The lowest layer comprises the full ordered sequence of values (such as share values). Higher layers contain successively sparser elements and are used to successively "bracket" values in lower layers until a desired element is located. In FIG. 7A, arrows between "boxes" indicate pointers. One feature of a skip list is that it enables searching with far fewer average operations than a linear search of the lowest level linked list would require. Another feature is that it allows for insertions and deletions without requiring the search path of elements from Head to Tail to change.

Figure 7B:
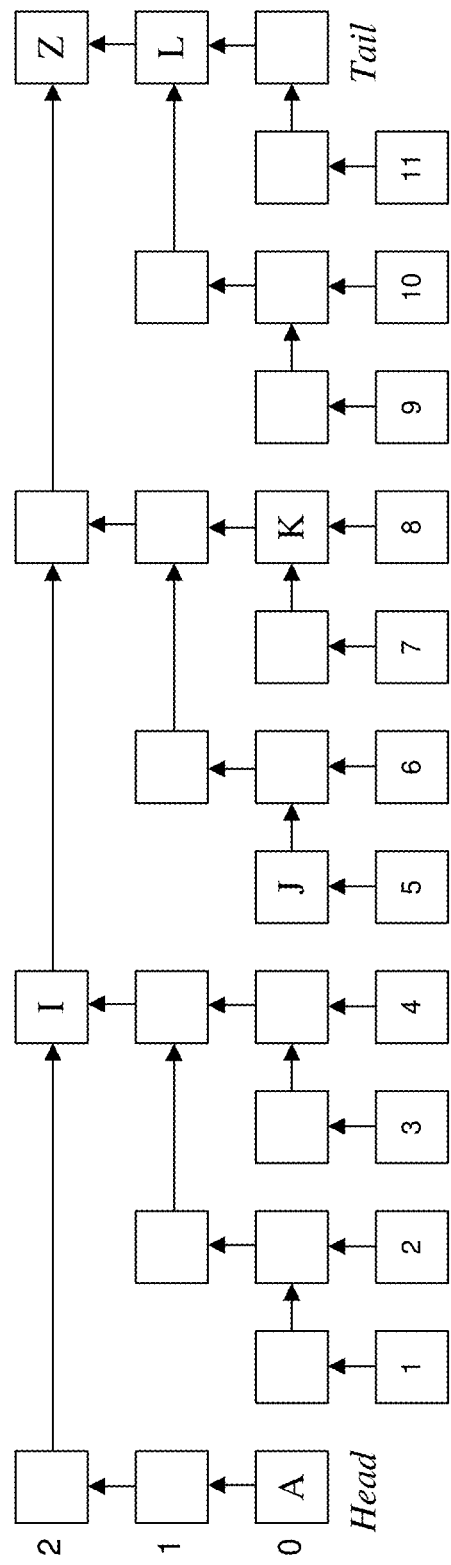

FIG. 7B shows a modification of the skip list, in which arrows indicate hashing operations instead of simple pointers. Thus, the value K=hash(hash(7) | 8), where "7" and "8" indicate the values stored in the respective numbered elements. Similarly, Z=hash(hash(I | hash(δ | K)) | L), and so on. For every element 1-11, there is a unique hash path (a "chain") to the highest level Tail value, that is, in FIG. 7B, the value Z. Values I and J are the previous and K and L are the subsequent sibling values on the path from 6 to Z. An initial Head value A may be included to form an initial "seed" for the structure.

To use a skip list such as is shown in FIGS. 7A and 7B in embodiments of the invention, the share values (or node input values) may form the lowest level elements (1-11 in FIG. 7B) and the value Z=Z[i] may be used in the manner described above for the hash tree root R[i] (and/or NR[j]), such as being posted to the bulletin board, etc. The path from each element to the Tail value Z may then function in a manner similar to a hash chain. Especially where large numbers of shares are anticipated, use of a skip list may enable an auditor to more quickly search for and find a share value in question.

System Components

Viewed from the system perspective, the different embodiments of the invention described above define a system of communicating computing devices that cooperate to enable accumulation of party input values A[i] in a manner that preserves the secrecy of the values. To accomplish this, various data structures are created and updated. Note that some data structure, even if a simple list, may be used by each party to store its share values A[i,j], by each node to accumulate the share values it receives, and by the central entity to accumulate the node values S[j].

Figure 8:
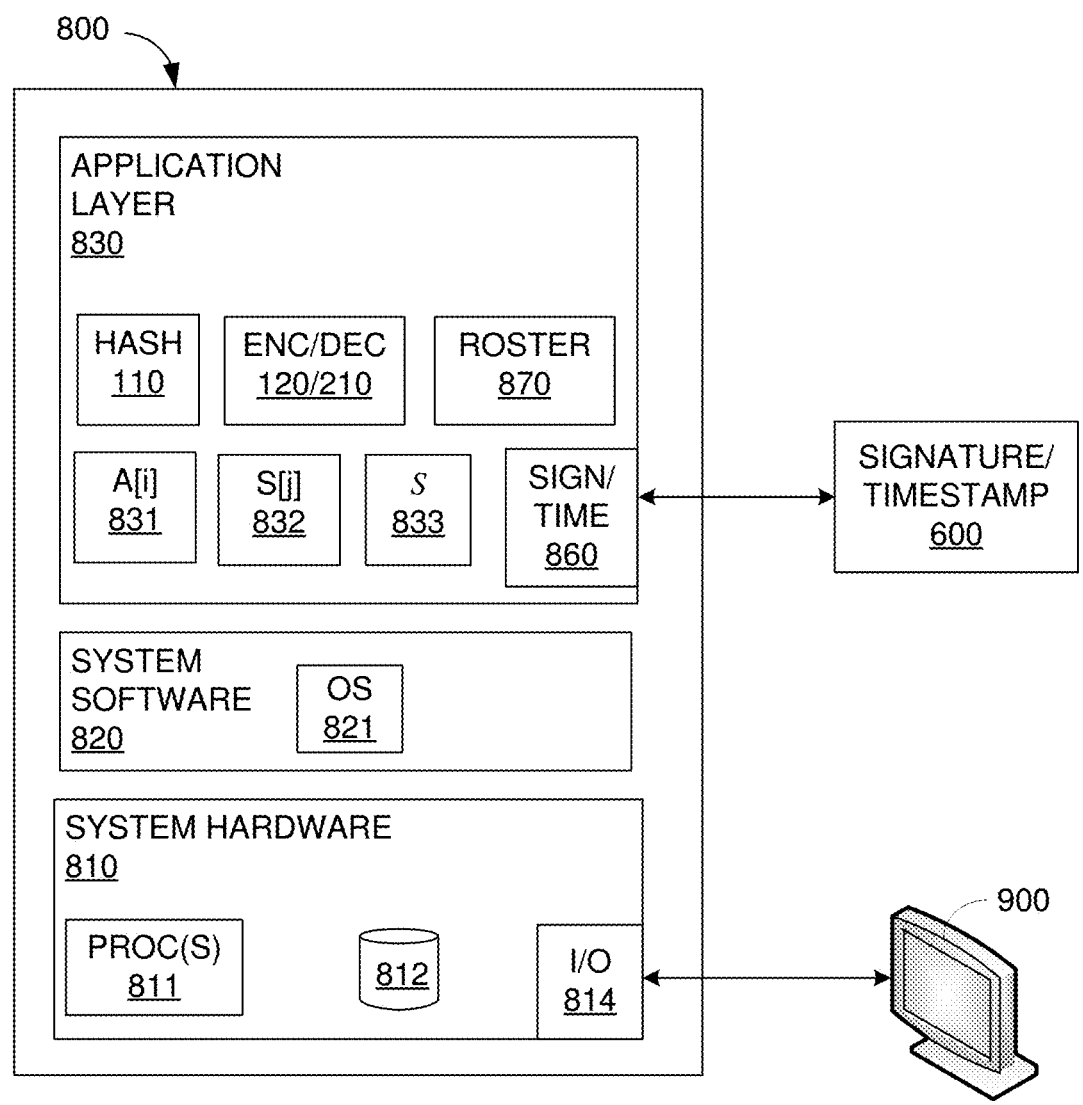
FIG. 8 illustrates the main hardware and software components of entities.

FIG. 8 illustrates the main hardware and software components of a computing system that may be used to implement any of the entities, that is, a party, a node, the central entity, or any system with which these communicate to implement, for example, the bulletin board 400 or signature service 600, if these are not included within one of the entities.

In general, each computing system 800 will include standard components such as system hardware 810 with at least one processor 811, some form of system software 820 such as an operating system 821 and/or virtual machine hypervisor, as well as volatile and/or non-volatile memory and/or storage, which is indicated "collectively" as component 812. The various data structures described herein, as well as the processor-executable code created to embody the software modules used to carry out the various computations and functions illustrated in FIGS. 1-7B, may be stored and thus embodied in either or both types of memory/storage components. Especially given the proliferation of high-speed "non-volatile" storage components, the difference between these two component classes is becoming less relevant. The software modules will comprise processor-executable code that, when run by the processor(s) 811, cause the processor(s) to carry out the corresponding functions.

Standard I/O access components 814 may also be included in each device to enable communication with other entities and systems over any known type of network, wireless or wired.

One or more entities may also include or connect to and control a display 900, with corresponding conventional drivers, etc.

FIG. 8 shows the system 800 as including an application layer 830, which comprises various software modules for performing the functions described above, for example, depending on the entity, decomposing party input values A[i] (831), computing hash values (110) and/or decryptions/encryptions (120, 210), computing node sums S[i] (832) or the final result S (833), etc. (not all of which will typically be included in one entity but are shown together for succinctness). If signatures/timestamps are used, these may be computed in an external system 600, whereby a software module 860 may also be included to format and submit requests appropriately and receive the results. Such an application layer is usually distinguished from the system software layer in that system software operates in a privileged mode with respect to its interaction with system hardware whereas "applications" don't.

Rosters 700, if implemented, may be created and stored within the storage component(s) 812 as other data structures, under the control of a corresponding software module 870.

The invention claimed is:

1. A method for communicating secret values from a plurality of parties to a central entity, comprising:
within each party,
generating a respective first plurality of share values such that the share values, when operated on according to a predetermined mathematical operation, yield a respective one of the secret values associated with the respective party;
applying the first plurality of share values as input values to a first multi-element data and computational structure that computes from the share values a unique first aggregation value and, for each share value, determines a unique, first repeatable relationship enabling recomputation of the first aggregation value from the corresponding share value;
storing each first aggregation value in a bulletin data structure accessible to an auditing entity; and
exposing the first plurality of share values separately to a respective plurality of nodes, each node thereupon computing a respective node output value by applying the predetermined mathematical operation to the share values received by the respective node and transmitting the respective node output value to a central entity, which thereupon computes a global value by applying the predetermined mathematical operation to the node output values received from the respective nodes;
whereby an audited one of the parties is considered validated if, upon subsequent application of its the first plurality of share values as input values to the multi-element data and computational structure, the same first aggregation value is obtained as was stored from the bulletin data structure.

2. The method of claim 1, in which:
the first multi-element data and computational structure is a hash tree;

the unique first aggregation value is a root value of the hash tree; and the unique, repeatable relationship is a representation of a recomputation path through the hash tree.

3. The method of claim 2, further comprising storing the root values corresponding to the parties in the bulleting data structure.

4. The method of claim 1, in which:

the first multi-element data and computational structure is in the form of a skip list;

the unique first aggregation value is a tail value of the skip list; and the unique, repeatable relationship is a representation of a recomputation path through the skip list.

5. The method of claim 1, further comprising, within each node, applying the share values received by the respective node as inputs to a second multi-element data and computational structure that computes from the share values received by the node a unique second aggregation value and determines a unique, second repeatable relationship enabling recomputation of the second aggregation value from the corresponding share values received by the respective node;

storing each second aggregation value in the bulletin data structure accessible to an auditing entity; and whereby an audited one of the nodes is considered validated if, upon subsequent application of its the share values received by the node as input values to the second multi-element data and computational structure, the same second aggregation value is obtained as was stored from the bulletin data structure.

6. The method of claim 1, further comprising:

within each party;

inputting from the bulletin data structure an encryption key stored in the bulletin data structure by each respective node that will receive any of the party's share values;

encrypting each share value using the encryption key corresponding to the respective node and causing the encrypted share values to be stored in the bulletin data structure;

exposing the share values to the nodes in the form of the encrypted share values stored in the bulletin data structure, whereupon the nodes obtain the share values from which to compute their respective node output values by inputting from the bulletin data structure and applying to each inputted encrypted share value a corresponding decryption key.

7. The method of claim 1, further comprising digitally signing contents of the bulletin data structure.

8. The method of claim 1, further comprising timestamping at least a partial state of the bulletin data structure.

9. The method of claim 1, further comprising creating a roster data structure having elements indicating which share values have been exposed to which nodes.

10. The method of claim 9, in which at least one party exposes fewer share values to nodes than a total number of nodes.

11. The method of claim 9, in which the number of the first plurality of shares is not constant over all of the parties.

12. The method of claim 11, further comprising including along with each share value exposed by each party to nodes additional data indicating a number of total shares of the party and an index value indicating its order among the number of total shares.

13. The method of claim 9, further comprising determining from the roster data structure whether the central entity has failed to receive information.

14. The method of claim 1, in which at least one share value of each party is an entropy-increasing phantom share value received from the central entity.

* * * * *